US012578998B2

(12) United States Patent
Ilangovan et al.

(10) Patent No.: US 12,578,998 B2
(45) Date of Patent: Mar. 17, 2026

(54) METHODS AND SYSTEMS FOR DYNAMIC ALLOCATION OF AGGREGATED RESOURCE TRANSFERS IN A DISTRIBUTED NETWORK

(71) Applicant: BANK OF AMERICA CORPORATION, Charlotte, NC (US)

(72) Inventors: Votreeshwaran Ilangovan, Jersey City, NJ (US); Lalit Dhawan, Cranbury, NJ (US); Sachin Falcao, Brooklyn, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 545 days.

(21) Appl. No.: 18/095,280

(22) Filed: Jan. 10, 2023

(65) Prior Publication Data

US 2024/0231908 A1     Jul. 11, 2024

(51) Int. Cl.
*G06F 9/50*          (2006.01)

(52) U.S. Cl.
CPC .......... *G06F 9/5011* (2013.01); *G06F 9/5072* (2013.01)

(58) Field of Classification Search
CPC ..................................................... G06F 9/5011
See application file for complete search history.

(56) References Cited

U.S. PATENT DOCUMENTS

| | | | |
|---|---|---|---|
| 8,897,221 B2 | 11/2014 | Sakoda et al. | |
| 10,091,366 B2 | 10/2018 | Cichielo et al. | |
| 10,334,026 B2 | 6/2019 | Dintenfass et al. | |
| 10,476,692 B2 | 11/2019 | Hedayat | |
| 10,524,165 B2 | 12/2019 | Greene et al. | |
| 10,917,923 B2 | 2/2021 | Cole et al. | |
| 11,039,437 B2 | 6/2021 | Morioka et al. | |
| 11,562,357 B2 | 1/2023 | Thomas et al. | |
| 11,588,802 B2 | 2/2023 | Way | |
| 12,106,281 B1 * | 10/2024 | Kurani .................. | G06Q 40/06 |
| 2007/0215684 A1 | 9/2007 | Jones | |
| 2021/0192479 A1 * | 6/2021 | Swaminathan ......... | G06F 21/53 |

(Continued)

OTHER PUBLICATIONS

Patriot Software, The Basics of Sales Tax Accounting, Oct. 4, 2018 (Year: 2018).*

(Continued)

*Primary Examiner* — Charlie Sun
(74) *Attorney, Agent, or Firm* — Moore & Van Allen PLLC; Michael M. McCraw

(57) ABSTRACT

Systems, methods, and computer program products are provided herein for dynamic allocation of aggregated resource transfers in a distributed network. An example method includes receiving resource transfer record data and determining that the resource transfer record data is indicative of an aggregated resource transfer associated with at least a first user and a second user. The method further includes generating first allocation data associated with the first user and generating second allocation data associated with the second user. The method also includes dynamically modifying the resource transfer record data based upon the first allocation data and the second allocation data. A user interface providing a visual representation of the first and second allocation data may be provided so as to provide for user interaction with this data.

20 Claims, 7 Drawing Sheets

(56)　　　　　References Cited

U.S. PATENT DOCUMENTS

2023/0214803 A1 *　7/2023　Schoen ................ G06Q 20/382
　　　　　　　　　　　　　　　　　　　　705/40
2024/0320718 A1 *　9/2024　Hecht .................. G06Q 20/367

OTHER PUBLICATIONS

Quickbooks, 2021 (Year: 2021).*
Seara, Luis Galdo. "Invoice Approval Workflow Improvement.", 2018 (Year: 2018).*

* cited by examiner

130

106

112

114

108

104

102

111

113

116

RECEIVE RESOURCE TRANSFER RECORD DATA
202

DETERMINE THAT THE RESOURCE TRANSFER RECORD DATA IS INDICATIVE OF AN AGGREGATED RESOURCE TRANSFER ASSOCIATED WITH AT LEAST A FIRST USER AND A SECOND USER
204

DEPLOY A TRAINED MACHINE LEARNING (ML) MODEL ON THE RESOURCE TRANSFER RECORD DATA
206

GENERATE FIRST ALLOCATION DATA ASSOCIATED WITH THE FIRST USER
208

GENERATE SECOND ALLOCATION DATA ASSOCIATED WITH THE SECOND USER
210

DYNAMICALLY MODIFY THE RESOURCE TRANSFER RECORD DATA BASED UPON THE FIRST ALLOCATION DATA AND THE SECOND ALLOCATION DATA
212

EFFECTUATE A RESOURCE TRANSFER BETWEEN THE SECOND USER AND THE FIRST USER BASED UPON THE MODIFIED RESOURCE TRANSFER RECORD DATA
214

FIG. 2

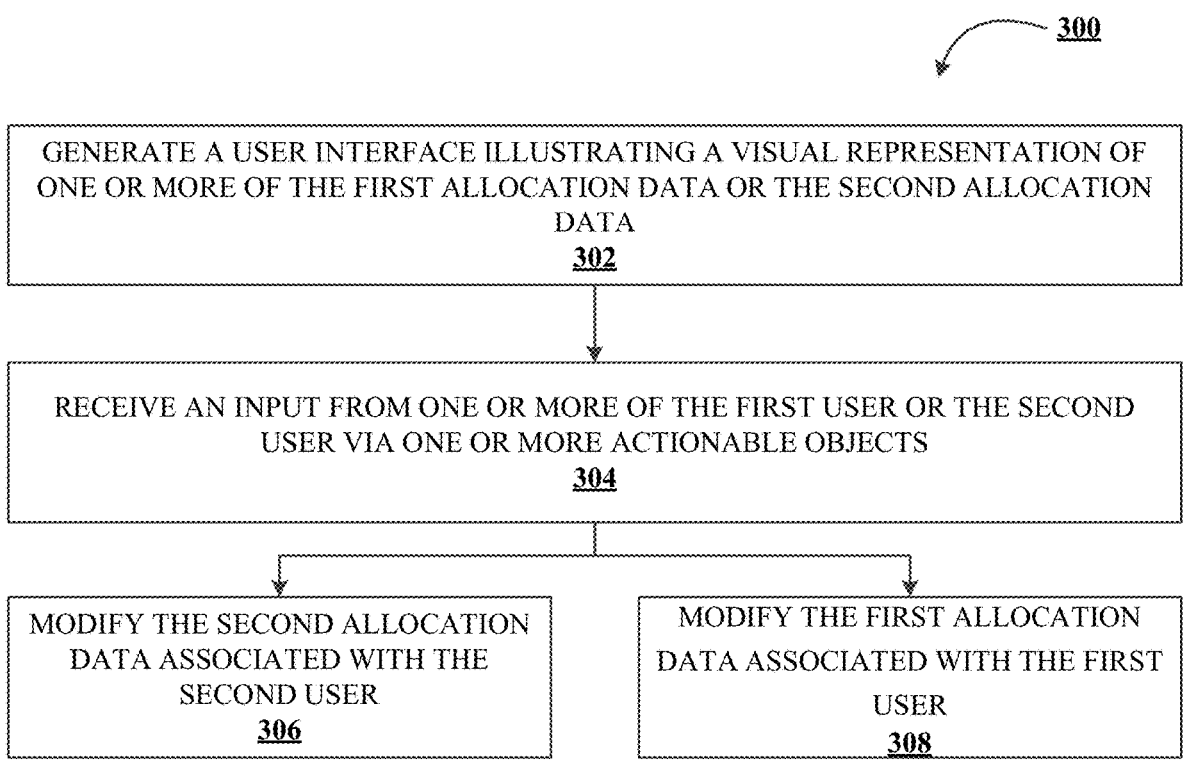

300

GENERATE A USER INTERFACE ILLUSTRATING A VISUAL REPRESENTATION OF ONE OR MORE OF THE FIRST ALLOCATION DATA OR THE SECOND ALLOCATION DATA
302

RECEIVE AN INPUT FROM ONE OR MORE OF THE FIRST USER OR THE SECOND USER VIA ONE OR MORE ACTIONABLE OBJECTS
304

MODIFY THE SECOND ALLOCATION DATA ASSOCIATED WITH THE SECOND USER
306

MODIFY THE FIRST ALLOCATION DATA ASSOCIATED WITH THE FIRST USER
308

FIG. 3

| Transaction List | |
| --- | --- |
| Aug 3, 2022 XYC restaurant............... | $ 33 |
| July 30, 2022 Online Purchase Dress........... | $22 |
| July 24 2022 Theme Park.......... | $215 |
| Transaction list............. | |
| Transaction list............. | |
| Transaction list............. | |
| Show More | |

400

Aug 3, 2022 XYC restaurant.............. $ 33

402

404

Aug 3, 2022 XYC restaurant................. $ 33

Edit

| Split Between |
| ZI User1 |
| ZI User 2 |
| ZI User3...... |

406

| Between (select % or users) | |
| --- | --- |
| You | X |
| ZI User1 | ✓ |
| ZI User 2 | ✓ |
| ZI User3 | ✓ |

METHODS AND SYSTEMS FOR DYNAMIC ALLOCATION OF AGGREGATED RESOURCE TRANSFERS IN A DISTRIBUTED NETWORK

TECHNOLOGICAL FIELD

Example embodiments of the present disclosure relate generally to resource transfer systems and, more particularly, to systems and methods for dynamically allocating aggregated resource transfers in distributed networks.

BACKGROUND

Resource transfer devices, objects, and systems are leveraged by a variety of industries in order to securely transmit resources between parties. In some instances, these resource transfers may involve numerous parties as part of a distributed network associated with discrete devices. Applicant has identified a number of deficiencies and problems associated with conventional resource transfer systems and associated methods. Through applied effort, ingenuity, and innovation, many of these identified problems have been solved by developing solutions that are included in embodiments of the present disclosure, many examples of which are described in detail herein.

BRIEF SUMMARY

Apparatuses, systems, methods, and computer program products are provided for dynamic allocation of aggregated resource transfers in a distributed network. In one aspect, a system for dynamic allocation of aggregated resource transfers in a distributed network may include at least one non-transitory storage device and at least one processor coupled to the at least one non-transitory storage device. The at least one processor may be configured to receive resource transfer record data and determine that the resource transfer record data is indicative of an aggregated resource transfer associated with at least a first user and a second user. The process may generate first allocation data associated with the first user and generate second allocation data associated with the second user. The processor may dynamically modify the resource transfer record data based upon the first allocation data and the second allocation data.

In some embodiments, the processor may be further configured to generate a user interface illustrating a visual representation of one or more of the first allocation data or the second allocation data.

In some further embodiments, the user interface may include one or more actionable objects configured to receive an input from one or more of the first user or the second user.

In some further embodiments, in response to a user input via the one or more actionable objects, the processor may be configured to modify the first allocation data associated with the first user modify the second allocation data associated with the second user.

In some still further embodiments, modification of the first allocation data and/or the second allocation data may be subject to one or more approval inputs of the first user or the second user.

In some embodiments, in generating the user interface, the at least one processor may be further configured to selectively obscure at least a portion of the first allocation data and/or the second allocation data.

In some embodiments, the resource transfer record data may be received in response to an image capturing operation performed by one or more imaging devices.

In some embodiments, the at least one processor may be further configured to deploy a trained machine learning (ML) model on the resource transfer record data to generate the first allocation data and/or the second allocation data.

In some embodiments, the at least one processor may be further configured to effectuate a resource transfer between the second user and the first user based upon the modified resource transfer record data. In such an embodiment, the resource transfer between the second user and the first user may occur as part of an aggregated resource transfer associated with a plurality of resource transfer record datasets including the resource transfer record data.

In another aspect, a computer program product for dynamic allocation of aggregated resource transfers in a distributed network is provided. The computer program product may include a non-transitory computer-readable medium comprising code. The code may cause an apparatus to receive resource transfer record data, determine that the resource transfer record data is indicative of an aggregated resource transfer associated with at least a first user and a second user, generate first allocation data associated with the first user, generate second allocation data associated with the second user, and dynamically modify the resource transfer record data based upon the first allocation data and the second allocation data.

In another aspect, a method for dynamic allocation of aggregated resource transfers in a distributed network is provided. The method may include receiving resource transfer record data, determining that the resource transfer record data is indicative of an aggregated resource transfer associated with at least a first user and a second user, generating first allocation data associated with the first user, generating second allocation data associated with the second user, and dynamically modifying the resource transfer record data based upon the first allocation data and the second allocation data.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 2 illustrates a method for dynamic allocation of aggregated resource transfers in a distributed network in accordance with one or more embodiments of the present disclosure;

FIG. 3 illustrates a method for user interface presentation and allocation data modification in accordance with one or more embodiments of the present disclosure.

DETAILED DESCRIPTION

Figure 1A:
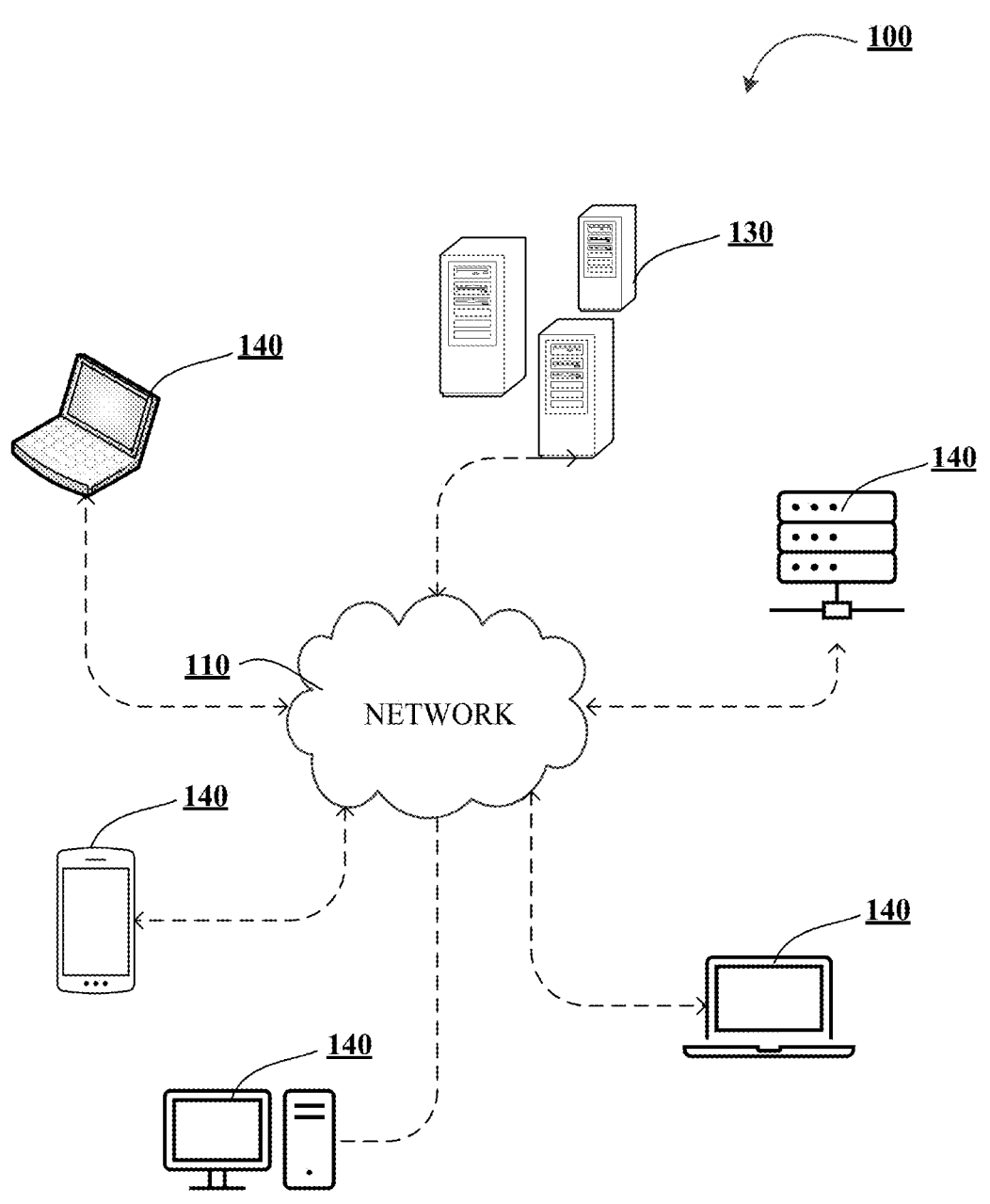
FIGS. 1A-1C illustrate technical components of an exemplary distributed computing environment for dynamic allocation of aggregated resource transfers in a distributed network in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with or otherwise interact with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity. Furthermore, the embodiments of the present disclosure are described hereafter with reference to a plurality of users (e.g., a first user, a second user, etc.) that may be "users" associated with an aggregated resource transfer (e.g., a multiparty transaction or the like). The present disclosure, however, contemplates that any number of users may be associated with a particular set of resource transfer data, a particular entity, and/or the like.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users. As described hereinafter, a user interface of the present disclosure may be configured to present one or more actionable objects configured to receive a user input. Receipt of such a user input via the actionable objects may be configured to execute one or more operations associated with the actionable object. The present disclosure contemplates that the arrangement, presentation, organization, etc. of the user interfaces described herein may vary based upon the intended application of the system but may at least be configured to provide a visual representation of the allocation data described herein.

As used herein, an "engine" or "module" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may permanently coupled together. Furthermore, operatively coupled components may mean that the components retain at least some freedom of movement in one or more directions or may be rotated about an axis (e.g., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like. As described hereinafter, an "interaction" between an entity and one or more users may result in the generation of resource transfer record data that details one or more parameters, characteristics, attributes, etc. associated with the interaction.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, resource transfer devices, objects, and systems are leveraged by a variety of industries in order to securely transmit resources between parties. In some instances, these resource transfers may involve numerous parties as part of a distributed network associated with discrete devices. By way of example, a plurality of users may each be party to a common event, interaction, or the like that results in a single resource transfer by one of the users. In such an example, a particular user (e.g., a first user) may be initially associated with (e.g., responsible for) a resource transfer with which at least one other user (e.g., a second user) is also related. In other words, the total amount, measure, supply, value, etc. defined by the resource transfer record may be attributable to at least the first user and the second user.

In these multi-user or aggregated resource transfers, other users (e.g., other than the first user) that were involved in or otherwise associated with the interaction that caused generation of the resource transfer record are often incapable of efficiently accounting to the first user for their associated portion of allocation of the resources used. For example, a conventional system may require that the other users (e.g., the second user, third user, etc.) individually determine their respective portions of the resource transfer record and subsequently account for this portion to the primary user (e.g., first user). In doing so, these conventional systems require that a single user account for the portions attributable to the plurality of users without assurance that these portions will be properly administered to the other users. Additionally or alternatively, the entity associated with the resource transfer record data may be required to divide the resource transfer into distinct, individualized transfers resulting in an additional burden on the entity for the same interaction.

In order to solve these issues and others, embodiments of the present disclosure provide systems and methods for identifying that a particular resource transfer record is indicative of an aggregated resource transfer of a plurality of users and subsequently allocating a portion of this record to particular users. These allocations may, in some instances, be provided to the individual users to confirm their assigned portions and may further allow for a collective consensus or approval to verify the allocation. In some instances, the embodiments described herein may leverage image capturing/processing techniques in order determine the aggregated resource transfer and/or the particular user associated with the transfer and may further leverage various machine learning and/or artificial intelligence techniques to improve one or more of these determinations.

Figure 1B:
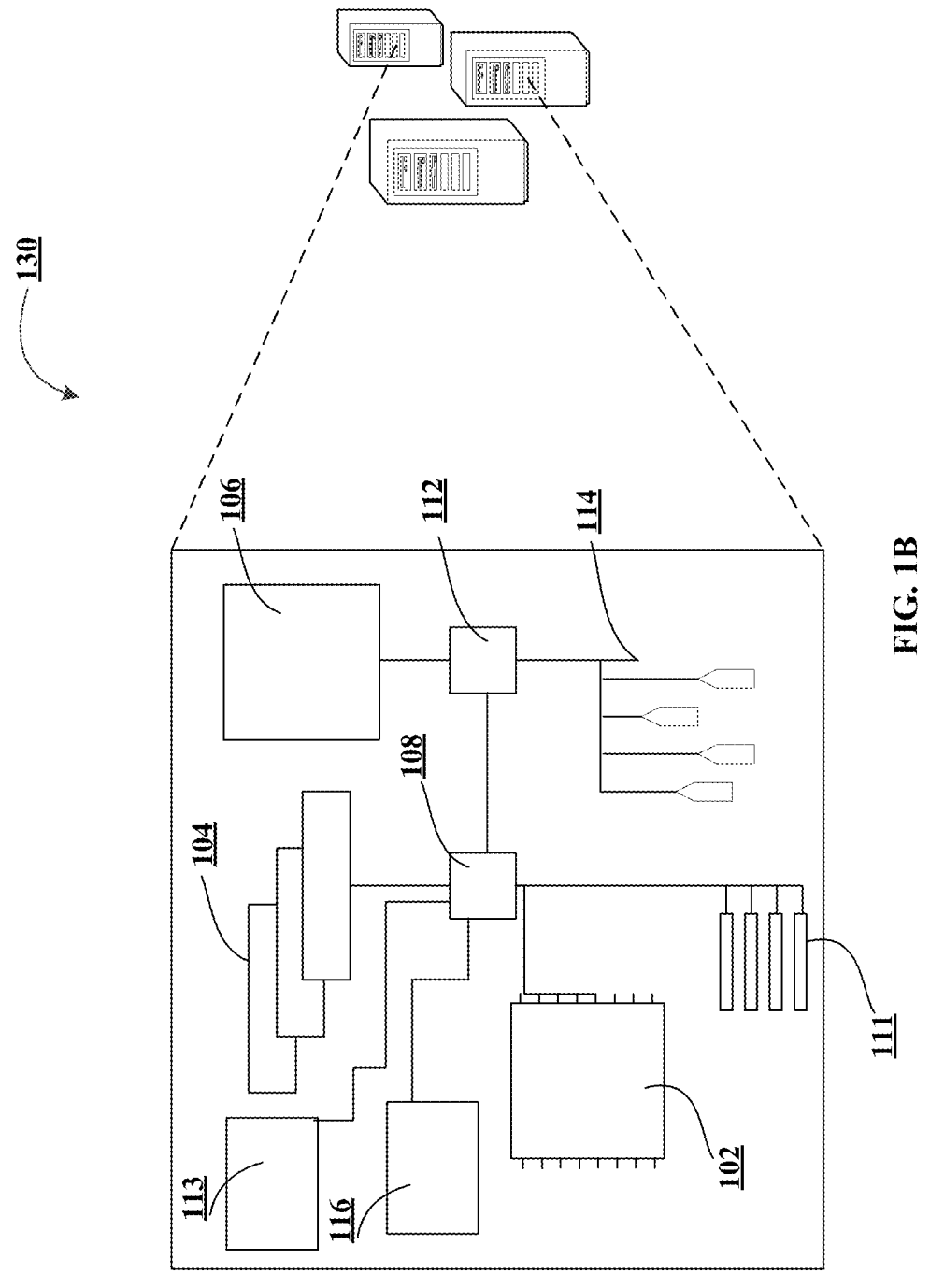
Figure 1C:
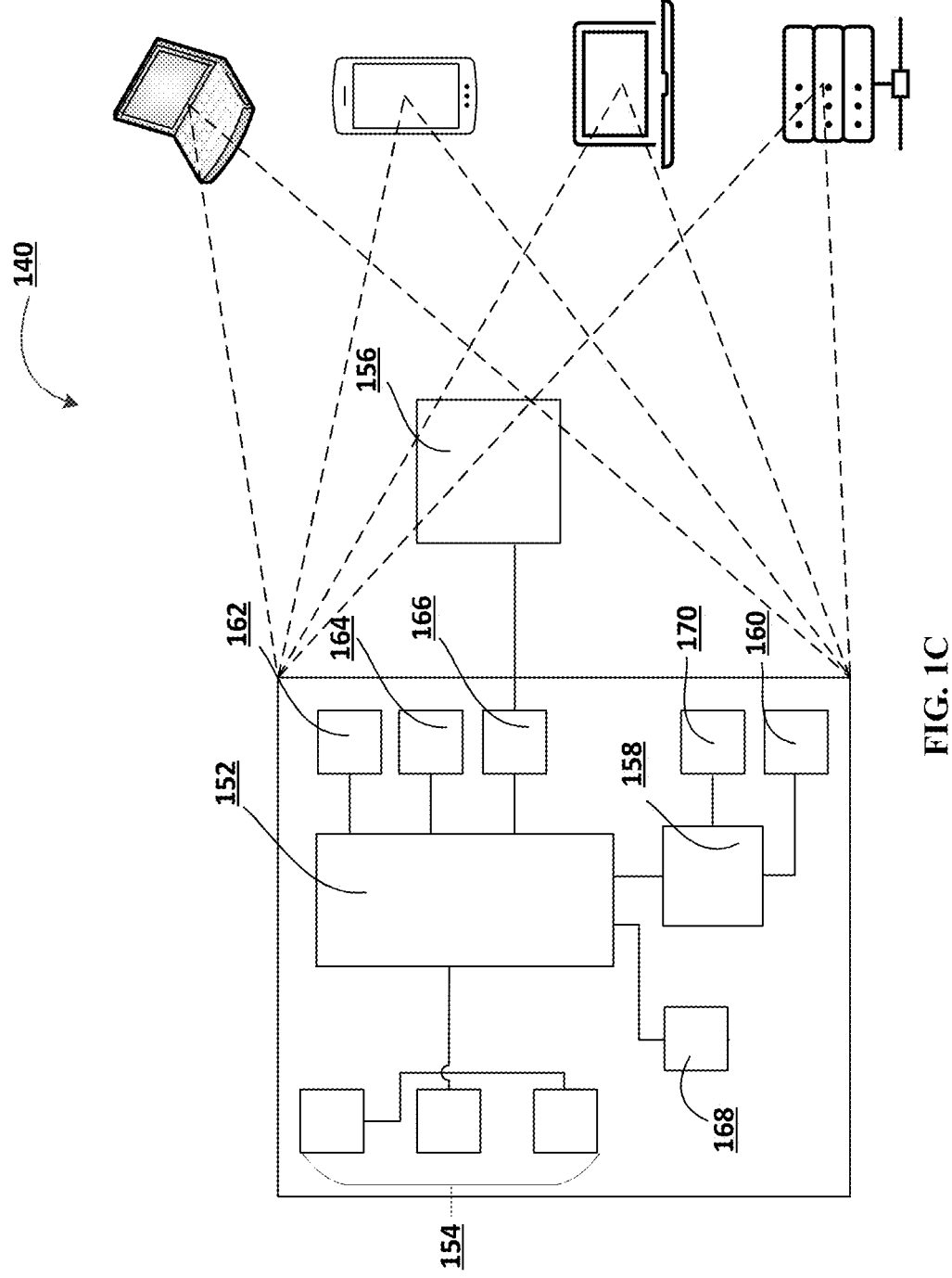

FIGS. 1A-1C illustrate technical components of an exemplary distributed computing environment for dynamic allocation of aggregated resource transfers in a distributed network 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., an automated teller machine (ATM)), and/or edge devices such as routers, routing switches, integrated access devices (IAD), and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, a storage device 110, and an imaging device or module 113. The system 130 may also include a high-speed interface 108 connecting to the memory 104, and a low-speed interface 112 connecting to low speed bus 114 and storage device 110. Each of the components 102, 104, 108, 110, 112, and 113 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), the imaging devices or modules 113, and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may further include one or more imaging devices or modules 113 configured to generate image data indicative of or otherwise associated with a resource transfer. By way of example, the one or more imaging devices or modules 113 may perform an image capture operation to generate image data that may be indicative of a physical object, such as a receipt, that operates as a record of a particular transaction between a user (or a plurality of users) and an entity. In doing so, the imaging devices or modules 113 may, in whole or in part, leverage one or more image processing techniques to at least partially convert the image data generated by the imaging devices or modules 113 into resource transfer record data. For example, the imaging devices or modules 113 may determine or otherwise ascertain various details of the resource transfer (e.g., the amount, the date, the associated users, the associated entity, etc.) and store this information as resource transfer record data. As such, the imaging devices or modules 113 may include any imaging devices, such as a camera, an imager, an IR camera, a thermographic camera, and/or any device configured to generate image data that includes radiation (e.g., light) having wavelengths/frequencies inside or outside of the visible range. Said differently, the imaging module 113 may capture, collect, etc. image data from across the electromagnetic range at various continuous spectral bands.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker. In some embodiments, the end-point device(s) 140 may include, in whole or in part, the imaging device or module 113 or otherwise be configured to perform the operations described herein with reference to the imaging device or module 113.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

FIG. 2 illustrates a flowchart containing a series of operations for example dynamic allocation of aggregated resource transfers in a distributed network (e.g., method 200). The operations illustrated in FIG. 2 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, imaging module 113, processor 152, etc.).

As shown in operation 202, the system 130 may be configured to receive resource transfer record data. As described above, a plurality of users may each be party to a common event, interaction, or the like that results in a single resource transfer by one of the users. By way of example, the resource transfer record data received at operation 202 may refer to a receipt of a transaction between a particular user (e.g., a first or primary user that satisfied the transaction) and an entity. By way of a particular example, the resource transfer record data may refer to data that is indicative of a physical receipt that documents or details the particular transaction. As such, in some embodiments, the resource transfer record data may be received at operation 202 in response to an image capturing operation performed by one or more imaging devices or modules 113. In such an example embodiment, the first user may, for example, capture an image of a physical receipt via the imaging device 113, and the imaging device 113 and/or the processor 102 may generate the resource transfer record data. As described above, the resource transfer record data may be indicative of various details of the resource transfer (e.g., the amount/value, the date, the associated users, the associated entity, etc.) and store this information as resource transfer record data.

In other embodiments, the resource transfer record data may be received at operation 202 in response to one or more user inputs. By way of example, a first user may, via a user interface, mobile application, mobile wallet, etc. supply one or more details of the resource transfer (e.g., the amount/value, the date, the associated users, the associated entity, etc.) for storing as resource transfer record data. In such an example, the user may, as described hereafter, list or otherwise indicate other users (e.g., at least a second user) that are associated with the particular resource transfer (e.g., transaction, exchange, or the like). Similarly, in other embodiments, the resource transfer record data may be received via a user input or automatically by the entity associated with the resource transfer (e.g., the opposing party to the transaction). By way of example, one or more systems, applications, etc. associated with the entity with which the user(s) interact may be operably coupled with the system 130. As such, the generation of an example resource transfer (e.g., transaction) between the user(s) and the entity may result in the generation of resource transfer record data by the entity.

Thereafter, as shown in operation 204, the system 130 may be configured to determine that the resource transfer record data is indicative of an aggregated resource transfer associated with at least a first user and a second user. As described above, various resource transfers (e.g., transactions, exchanges, etc.) may include a plurality of users or otherwise be multi-party in nature. For example, a particular user (e.g., a first user) may be initially associated with (e.g., responsible for) a resource transfer with which at least one other user (e.g., a second user) is also related. In other words, the total amount, measure, supply, value, etc. defined by the resource transfer record may be attributable to at least the first user and the second user. Although described herein with reference to a first user and a second user, the present disclosure contemplates that any number of users (e.g., a first user, a second user, . . . an $N^{th}$ user) may be associated with a particular transaction as defined by the resource transfer record data.

The determination at operation 204 may, in some embodiments, occur in response to one or more inputs by the first user as part of the initial resource transfer. For example, the generation of the resource transfer record data that is received at operation 202 may occur in response to one or more inputs by the first user. As such, the first user may indicate, via an input receive from an example user interface, that the resource transfer (e.g., transaction) defined by the resource transfer data is an aggregated resource transfer (e.g., that other parties were present or associated with the transfer). In some embodiments, the first user may explicitly provide or otherwise indicate the other users (e.g., at least the second user) that are associated with the resource transfer record data. For example, the first user, via a user interface or the like, may be provided with a listing or other searchable repository by which the first user may select other users to associate with the resource transfer record data.

Additionally or alternatively, the system 130 may be configured to suggest or otherwise automatically determine the particular users (e.g., at least the second user) associated with the aggregated resource transfer. By way of example, the system 130 may be configured to generate or receive other sources of data that are attributable to particular users. The first user and/or the second user may, for example, be associated with one or more mobile devices that generate location data that may also be provided to the system 130. As such, the system 130 may be configured to, via a comparison between the location data of the first user and the location data of the second user at a time associated with the resource transfer, determine that the resource transfer record is indicative of an aggregated resource transfer that includes the first user and the second user. Additionally or alternatively, the system 130 may be configured to access one or more accounts, applications, mobile wallets, etc. associated with the first user and/or the second user. For example, the system 130 may access one or more accounts of the first user and/or the second user to identity similar and/or recurring resource transfers (e.g., with the same entity, at similar times, etc.) and determine that the resource transfer record data received at operation 202 is aggregated and associated with the first and second users.

In some embodiments, as shown in operation 206, the system 130 may be configured to deploy a trained machine learning (ML) model on the resource transfer record data to generate the first allocation data and/or the second allocation data as described hereafter. The trained ML model may also refer to a mathematical model generated by machine learning algorithms based on training data (e.g., various feature sets of resource transfer record data), to make predictions or decisions without being explicitly programmed to do so. The trained ML model may similarly represent what was learned by the selected machine learning algorithm and represent the rules, numbers, and any other algorithm-specific data structures required for decision-making. Selecting the right machine learning algorithm may depend on a number of different factors, such as the problem statement and the kind of output needed, type and size of the data, the available computational time, number of features and observations in the data, and/or the like. The trained ML model or algorithm may also refer to programs that are configured to self-adjust and perform better as they are exposed to more data. To this extent, the trained ML model or algorithm is also capable of adjusting its own parameters, based on previous performance in making prediction about a dataset.

The ML algorithms contemplated, described, and/or used herein (e.g., the trained ML model) may include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML models may be trained using repeated execution cycles of experimentation, testing, and tuning to modify the performance of the ML algorithm and refine the results in preparation for deployment of those results for consumption or decision making. The ML models may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model is the measurement used to determine which set of hyperparameters is best at identifying relationships and patterns between variables in a dataset based on the input, or training data. A fully trained ML model is one whose hyperparameters are tuned and model accuracy maximized.

Thereafter, as shown in operations 208 and 210, the system 130 may be configured to generate first allocation data associated with the first user and generate second allocation data associated with the second user. By way of continued example, the resource transfer record data may be indicative of an aggregated resource transfer that includes at least the first user and the second user. As such, at least a portion of the resource transfer may be attributable to the first user and the second user. By way of a particular, non-limiting example, the resource transfer record data may be associated with a transaction between the first user and an entity that is initially funded by the first user (e.g., a common meal, event, etc. attended by both the first user and the second user). As such, the first user may have contributed only a portion of the total resources (e.g., cost) associated with the resource transfer (e.g., transaction) while initially funding the entire resource transfer (e.g., for convenience or the like).

Figures 4A, 4B:
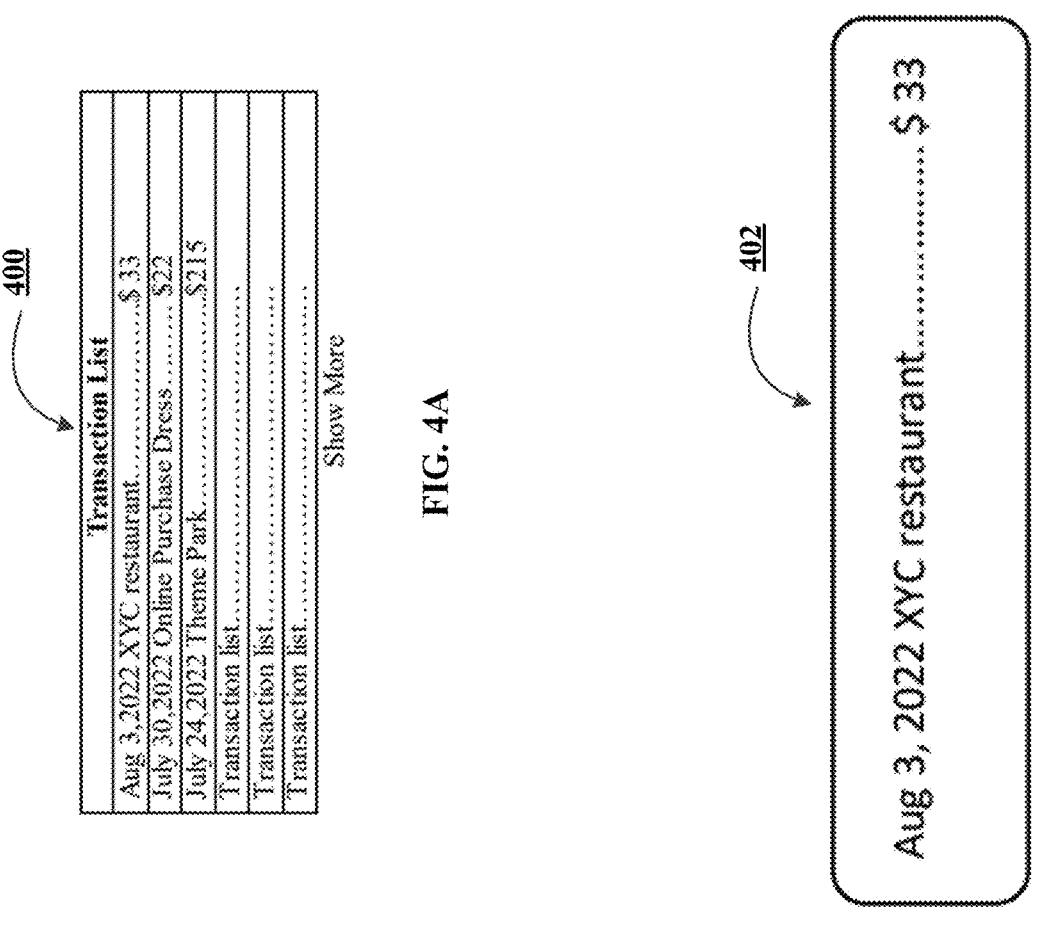
FIGS. 4A-4D illustrate example user interface representations in accordance with one or more embodiments of the present disclosure.
Figures 4C, 4D:
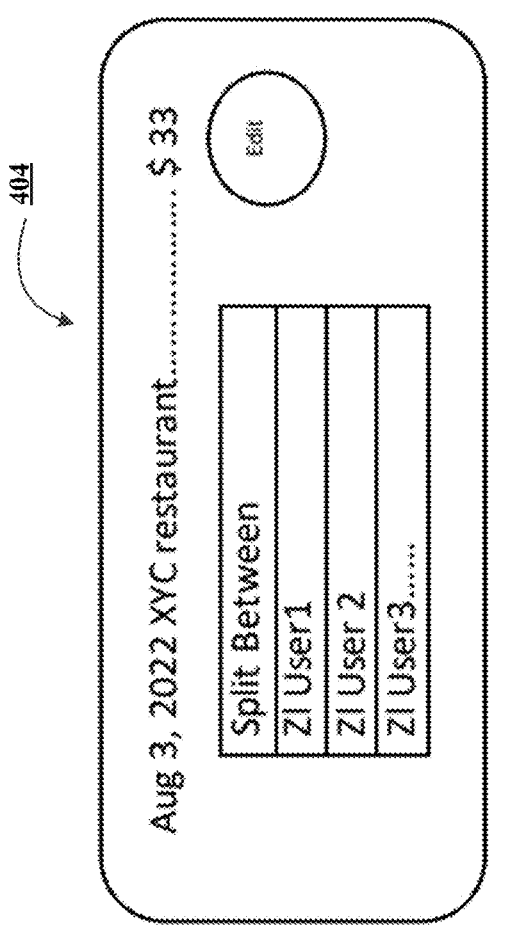

In some embodiments, the generation of the first and second allocation data at operations 208, 210 may be based upon one or more user inputs by the first user. By way of example and as illustrated in FIGS. 4A-4B, the first user may, via a user interface, select an amount or portion of the resources (e.g., cost, value, etc.) attributable to the other users. The first user may, for example, select a first portion of the total resources defined by the resource transfer record data and attribute this portion to the first user. The first user may similarly select a second portion of the total resources defined by the resource transfer record data and attribute this portion to the second user. The portion may be used to generate the respective first and second allocation data. This allocation data may be subsequently modified, disputed, etc. by the other users (e.g., at least the second user) as described hereafter with reference to FIG. 3. In some embodiments, the first allocation data may be generated in response to generation of the second allocation data. For example, in an instance in which only the first user and the second user are associated with the aggregated resource transfer, the generation of the second allocation data (e.g., the portion attributable to the second user) may consequently define the portion associated with the first user.

Additionally or alternatively, the system 130 may automatically, via the deployed ML model, generate the first allocation data and/or the second allocation data. By way of continued example, the system 130 may deploy various ML models that may be trained upon prior iterations of the operations of FIG. 2 and/or one or more feature sets associated with the resource transfer record data. In doing so, the system 130 may operate to predict the allocations associated with particular users (e.g., the first user, the second user, etc.). The present disclosure contemplates that system 130 may leverage any number of data sources, ML models, and/or the like based upon the intended application of the system 130 in order to improve the allocation determinations described herein.

Thereafter, as shown in operation 212, the system 130 may be configured to dynamically modify the resource transfer record data based upon the first allocation data and the second allocation data. By way of continued example, the first user may initially complete the resource transfer defined by the resource transfer record data such that the portion attributable to the second user is to be provided to the first user, such as a repayment of funds. In order to subsequently effectuate this resource transfer between the first user and the second user (e.g., in satisfaction of the portion attributable to the second user), the system 130 may modify the resource transfer records data. As described hereafter with reference to FIG. 3, the resource transfer record data may be dynamically modified based upon one or more inputs by the other users (e.g., at least the second user). For example, the second user may, via user input or otherwise, modify the second allocation data and/or the first allocation data such that the resource transfer record data is also subsequently modified.

In some embodiments, as shown in operation 214, the system 130 may be configured to effectuate a resource transfer between the second user and the first user based upon the modified resource transfer record data. By way of continued example, the first user may initially complete the resource transfer defined by the resource transfer record data such that the portion attributable to the second user is to be provided to the first user. Following modification of the resource transfer record data to include the respective allocation data, the system 130 may cause a transfer of resources (e.g., funding or the like) between the first user and the second user. By way of example, the system 130 may include or otherwise access one or more accounts associated with the first user and/or the second user. As such, operation 214 may include instructions for effectuating a resource transfer from the account of the second user to the first user in satisfaction of the portion of the resource transfer that is allocated to the second user (e.g., defined by the second allocation data).

In some embodiments, the resource transfer between the second user and the first user may occur as part of an aggregated resource transfer associated with a plurality of resource transfer record datasets including the resource transfer record data. By way of example, the first user, the second user, etc. may interact with a user interface, mobile application, etc. that is offered by the system 130 that supports a plurality of aggregated resource transfers. As such, the second user in the example embodiment may aggregate resource transfers to various users to reduce the transaction burden associated with traditionally systems. For example, the first user and the second user may frequently engage in aggregated resource transfers that include both the first user and the second user (e.g., commonly attended events or the like). As such, these users may use aggregated resource transfers associated with a plurality of resource transfer record datasets including the resource transfer record data as opposed to distinct resource transfers for each allocation data.

FIG. 3 illustrates a flowchart containing a series of operations for user interface presentation and allocation data modification (e.g., method 300). The operations illustrated in FIG. 3 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, imaging devices or modules 113, processor 152, etc.).

As described above with reference to FIG. 2, the embodiments described herein may generate and present to various users a user interface illustrating a visual representation of the data described herein so as to allow for user interaction with the system 130. As shown in operation 302, the system 130 may generate a user interface illustrating a visual representation of one or more of the first allocation data or the second allocation data. The user interface, an example of which is illustrated in FIGS. 4A-4D, may provide a visual representation of various details (e.g., amount, date, value, associated users, associated entity, and/or the like) with the resource transfer as defined by the resource transfer record data. The user interface may further include one or more actionable objects configured to receive an input from the various users (e.g., the first user, the second user, etc.). By way of example, the actionable objects may refer to one or more menus, buttons, knobs, free-text inputs, sliders, etc. by which a user may provide an input to the system 130. The present disclosure contemplates that any number of actionable objects may be provided or presented to the user(s) to allow any type of interaction with the system 130. Furthermore, the present disclosure contemplates that the arrangement, type, organization, etc. of the data presented to the user(s) may similarly vary based upon the intended application of the system 130.

In some embodiments, such as when the user interface is commonly viewable by multiple users (e.g., the first user and the second user), the system 130 may operate to selectively obscure at least a portion of the data presented by the user interface. As would be evident to one of ordinary skill in the art in light of the present disclosure, the user interface may operate to present data that is user-specific (e.g., account name/number, address, etc.) that may be sensitive to a particular user. In order to prevent the unintentional viewing of this data by other users, the embodiments described herein may operate to obscure (e.g., redact, blur, etc.) particular portions of the presented data. By way of a non-limiting example, a user interface that is presented to the second user may selectively obscure portions of the first allocation data associated with the first user.

As shown in operation 304, the system 130 may receive an input from one or more of the first user or the second user via one or more actionable objects. By way of example, the user interface may present to the first user and/or the second user a visual representation of the total amount of resources defined by the resource transfer record data. The user interface may further provide one or more actionable objects associated with a particular allocation assigned to particular users (e.g., by percentage or the like). In some embodiments, the actionable objects may be configured to receive a user input accepting the allocation data presented by the user interface. In other embodiments, the one or more actionable objects may be configured to receive one or more user inputs modifying the first allocation data and/or the second allocation data as described hereafter. In some embodiments, the approvals received as a user input via the actionable objects may be subjected to a consensus determination in which the number of approvals are compared against an approval threshold. Such an approval threshold may operate to ensure that any allocations and/or modifications to these allocations are approved by an appropriate (e.g., majority or the like) of the users associated with the resource transfer.

As shown in operations 306 and 308, the system 130 may be configured to receive a user input that modifies the first allocation data associated with the first user and/or receive a user input that modifies the second allocation data associated with the second user. By way of a non-limiting example, the user interface may illustrate first allocation data that is indicative of a portion of the resource transfer that is to be funded by the first user and may illustrate second allocation data that is indicative of a portion of the resource transfer that is to be funded by the second user. Upon reviewing the user interface, the second user, for example, may dispute the portion of the resource transfer that is allocated to the second user and/or the first user. Although described herein with reference to the second user, the present disclosure contemplates that any number of respective users may, via the user interface, request modification of the respective allocations assigned to the users associated with the resource transfer. In some embodiments, the input received via the user interface may operate to modify the first or second allocation data in response to the portion that the second user attempts to assign to the respective user(s). As described above, these modifications may be subject to various approvals by other users to ensure proper allocation to respective users.

With reference to FIGS. 4A-4B, example user interface representations are illustrated. As shown in FIG. 4A, the user interface 400 may illustrate a plurality of resource transfers (e.g., transactions) to which the first user is a party. As shown in the user interface 402 of FIG. 4B, the first user (e.g., or any user associated with the user interface) may select a particular resource transfer (e.g., an aggregated resource transfer) from amongst the resource transfers illustrated in FIG. 4A for performing subsequent allocation operations. As shown in the user interface 404 of FIG. 4C, the first user may select a plurality of users (e.g., ZI User 1, ZI User 2, ZI User 3, etc.) that are associated with the aggregated resource transfer. As shown in the user interface of FIG. 4D, the first user may select a particular portion (e.g., generate allocation data) for each of the selected users and each portion may be subject to approval by the remaining users that are a party to the aggregated resource transfer. As described above, the user interfaces 400, 402, 404, 406 may vary in style, type, configuration, orientation, etc. based upon the intended application of the system 130.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for dynamic allocation of aggregated resource transfers in a distributed network, the system comprising:

at least one non-transitory storage device; and at least one processor coupled to the at least one non-transitory storage device, wherein the at least one processor is configured to:

receive resource transfer record data;

determine that the resource transfer record data is indicative of an aggregated resource transfer associated with at least a first user and a second user such that a portion of the resource transfer record data is attributable to the first user and another portion of the resource transfer record data is attributable to the second user;

deploy a trained machine learning (ML) model on the resource transfer record data;

generate, based on an output of the deployed trained ML model, first allocation data of the resource transfer record data that is associated with the first user;

generate, based on the output of the deployed trained ML model, second allocation data of the resource transfer record data that is associated with the second user;

generate a user interface illustrating a visual representation of the first allocation data and the second allocation data;

selectively obscure at least a portion of the first allocation data or the second allocation data on the user interface; and dynamically modify the resource transfer record data based upon the first allocation data and the second allocation data.

2. The system of claim 1, wherein the user interface includes one or more actionable objects configured to receive an input from one or more of the first user or the second user.

3. The system of claim 2, wherein, in response to a user input via the one or more actionable objects, the at least one processor is further configured to:

modify the first allocation data associated with the first user; and/or modify the second allocation data associated with the second user.

4. The system of claim 3, wherein modification of the first allocation data and/or the second allocation data is subject to one or more approval inputs of the first user or the second user.

5. The system of claim 1, wherein the resource transfer record data is received in response to an image capturing operation performed by one or more imaging devices.

6. The system of claim 1, wherein the at least one processor is further configured to effectuate a resource transfer between the second user and the first user based upon the modified resource transfer record data.

7. The system of claim 6, wherein the resource transfer between the second user and the first user occurs as part of an aggregated resource transfer associated with a plurality of resource transfer record datasets including the resource transfer record data.

8. A computer program product for dynamic allocation of aggregated resource transfers in a distributed network, the computer program product comprising a non-transitory computer-readable medium comprising code causing an apparatus to:

receive resource transfer record data;

determine that the resource transfer record data is indicative of an aggregated resource transfer associated with at least a first user and a second user such that a portion of the resource transfer record data is attributable to the first user and another portion of the resource transfer record data is attributable to the second user;

deploy a trained machine learning (ML) model on the resource transfer record data;

generate, based on an output of the deployed trained ML model, first allocation data of the resource transfer record data that is associated with the first user;

generate, based on the output of the deployed trained ML model, second allocation data of the resource transfer record data that is associated with the second user;

generate a user interface illustrating a visual representation of the first allocation data and the second allocation data;

selectively obscure at least a portion of the first allocation data or the second allocation data on the user interface; and dynamically modify the resource transfer record data based upon the first allocation data and the second allocation data.

9. The computer program product of claim 8, wherein the user interface includes one or more actionable objects configured to receive an input from one or more of the first user or the second user.

10. The computer program product of claim 9, wherein, in response to a user input via the one or more actionable objects, the apparatus is configured to:

modify the first allocation data associated with the first user; and/or modify the second allocation data associated with the second user.

11. The computer program product of claim 10, wherein modification of the first allocation data and/or the second allocation data is subject to one or more approval inputs of the first user or the second user.

12. The computer program product of claim 8, wherein the resource transfer record data is received in response to an image capturing operation performed by one or more imaging devices.

13. The computer program product of claim 8, wherein the apparatus is further configured to effectuate a resource transfer between the second user and the first user based upon the modified resource transfer record data.

14. The computer program product of claim 13, wherein the resource transfer between the second user and the first user occurs as part of an aggregated resource transfer associated with a plurality of resource transfer record datasets including the resource transfer record data.

15. A method for dynamic allocation of aggregated resource transfers in a distributed network, the method comprising:

receiving resource transfer record data;

determining that the resource transfer record data is indicative of an aggregated resource transfer associated with at least a first user and a second user such that a portion of the resource transfer record data is attributable to the first user and another portion of the resource transfer record data is attributable to the second user;

deploying a trained machine learning (ML) model on the resource transfer record data;

generating, based on an output of the deployed trained ML model, first allocation data of the resource transfer record data that is associated with the first user;

generating, based on the output of the deployed trained ML model, second allocation data of the resource transfer record data that is associated with the second user;

generating a user interface illustrating a visual representation of the first allocation data and the second allocation data;

selectively obscuring at least a portion of the first allocation data or the second allocation data on the user interface; and dynamically modifying the resource transfer record data based upon the first allocation data and the second allocation data.

16. The method of claim 15, wherein the user interface includes one or more actionable objects configured to receive an input from one or more of the first user or the second user.

17. The method of claim 16, in response to a user input via the one or more actionable objects, further comprising:

modifying the first allocation data associated with the first user; and/or modifying the second allocation data associated with the second user.

18. The method of claim 17, wherein modification of the first allocation data and/or the second allocation data is subject to one or more approval inputs of the first user or the second user.

19. The method of claim 15, wherein the resource transfer record data is received in response to an image capturing operation performed by one or more imaging devices.

20. The method of claim 15, further comprising effectuating a resource transfer between the second user and the first user based upon the modified resource transfer record data.

\*    \*    \*    \*    \*